March 1, 1927.  E. G. THOMAS  1,619,165
WEIGHING SCALE
Filed Feb. 2, 1924  2 Sheets-Sheet 1
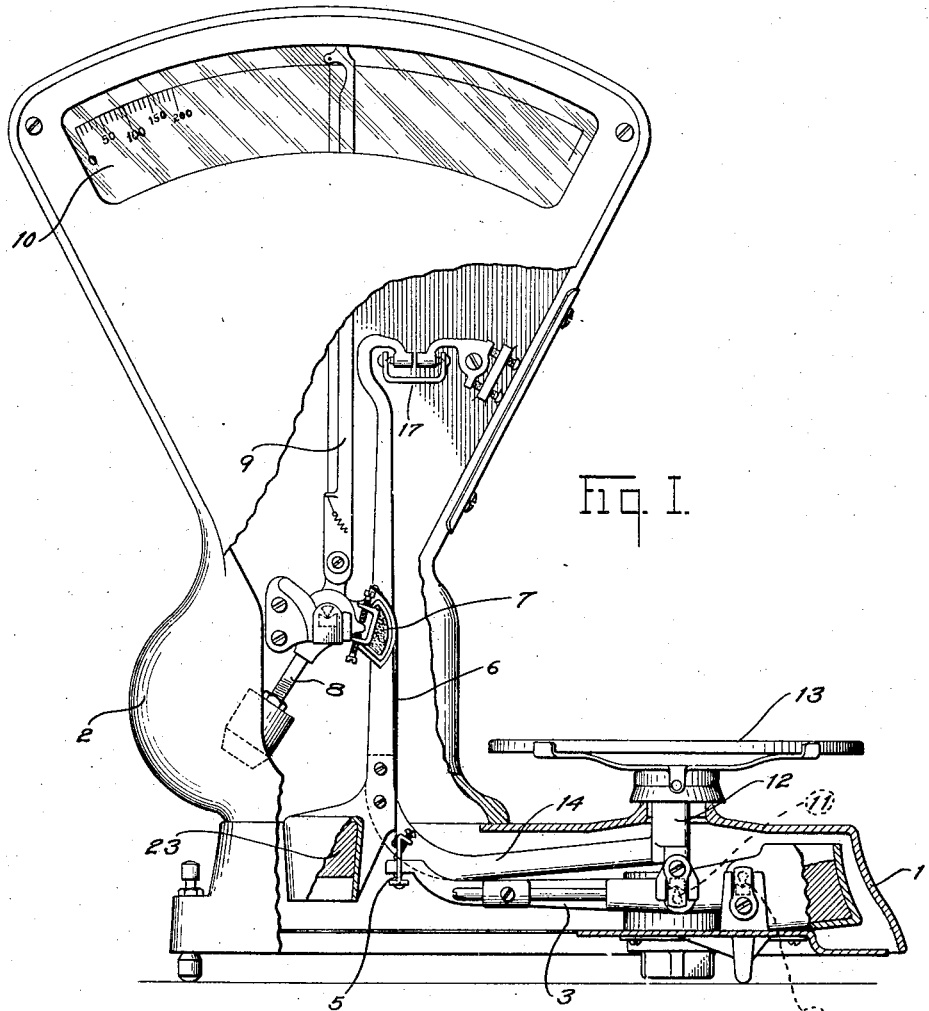
Fig. I.
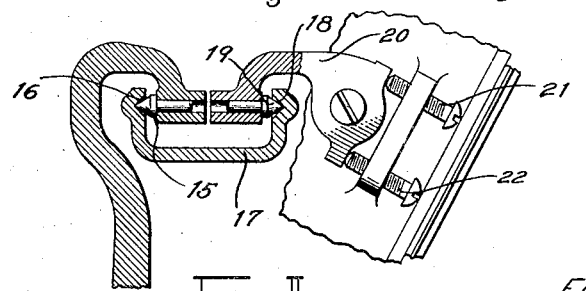
Fig. II.
Inventor
Edward G. Thomas.
By C. C. Marshall
Attorney March 1, 1927. E. G. THOMAS 1,619,165
WEIGHING SCALE
Filed Feb. 2, 1924 2 Sheets-Sheet 2
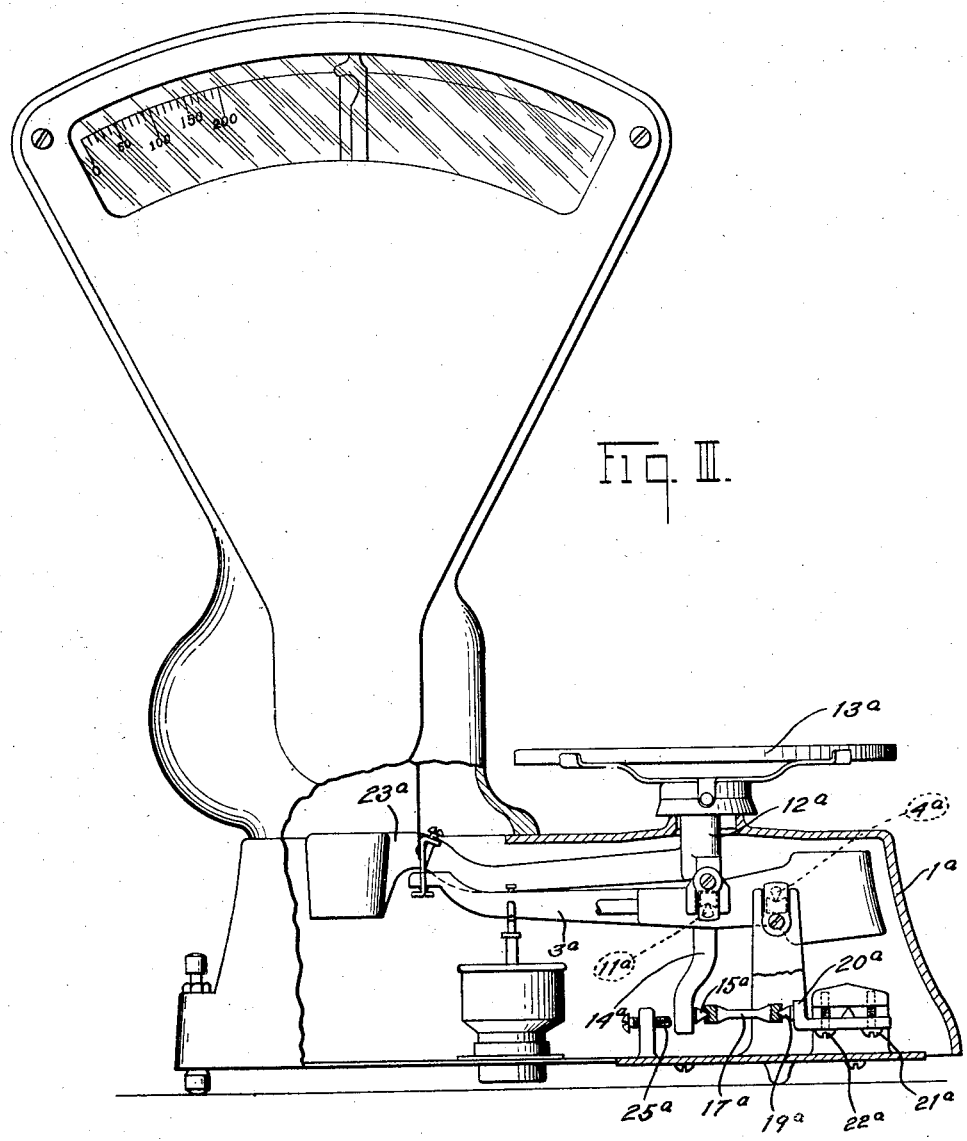
Fig. II.
Inventor
Edward G. Thomas
By E. M. Marshall
Attorney Patented Mar. 1, 1927.

1,619,165

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 2, 1924. Serial No. 690,114.

This invention relates to weighing scales, and one of its principal objects is to improve the means employed for preventing the platform from tipping when a load is placed adjacent one of its edges.

A more specific object of the invention is the provision of a reliable platform stabilizing mechanism in which the check link is always in tension or compression and push and pull connections are eliminated.

Still another object is the provision of a device of this character which may be economically manufactured and readily assembled in the scale and which is capable of easy and accurate adjustment.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a scale embodying one form of my invention, parts being broken away and parts being shown in section in order that the platform stabilizing mechanism may be clearly shown;

Figure II is an enlarged fragmentary elevational view, partly in section, showing the check link and its connected parts in detail; and Figure III is a front elevational view of a scale embodying another form of my invention, parts being broken away and parts being shown in section.

The scale illustrated in Figure I is of the well known automatic fan type having a base housing 1 upon which is mounted an upright housing 2, the upper end of which is of substantially fan shape. In this type of scale a platform lever 3 is fulcrumed on suitable bearings 4 within the base housing 1, the nose 5 of the lever 3 being connected by means of a flexible metallic ribbon 6 to the power sector 7 of a load-counterbalancing pendulum 8 which is provided with an indicating hand 9 that swings over a suitable chart 10 located in the fan shaped portion of the upright housing 2. Mounted upon load pivots 11 which are fixed to the lever 3 is a platform spider 12 which supports a commodity-receiving platform or platter 13. Fixedly secured to the platform spider 12 and extending to the right through the base housing 1 and thence upwardly into the upright housing 2 is a bent arm 14, the upper end of which is provided with a cone pivot 15 which has a bearing in a socket 16 in one end of a check link 17. The other end of the link 17 is provided with a similar socket 18 which engages a cone pivot 19 projecting from an arm 20 which is pivotally mounted within the upright housing 2 so that by the manipulation of adjusting screws 21 and 22 it may be rocked to raise or lower the pivot 19.

The parts are so proportioned and arranged that lines connecting the pivots 15, 19, 4 and 11 form a parallelogram. When the load pivot 11 is swung about the fulcrum pivot 4 the pivot 15 swings about the pivot 19 to the same extent and the platform 13 is thus kept level throughout weighing movements of the scale.

In order that the pivot 15 may always seat firmly in the socket 16 of the link 17 and the link be kept under tension even though a capacity load be placed at the extreme right side of the platform 13, a weight 23 is fixed to the bent arm 14, the mass of the weight and its distance from the load pivot 11 being sufficient to more than counterbalance a capacity load on the right side of the platter 13. This weight, therefore, always holds the pivot 15 in the socket 16 and keeps the socket 18 firmly engaged with the pivot 19, regardless of the position of a load on the platter 13.

When the pivots 4, 11, 15 and 19 are in parallelogrammatic relation the effect of a load on the automatic load-counterbalancing mechanism will not be affected by a change in position of the load on the platform. By adjusting the position of the pivot 19 this parallelogrammatic relation may be secured and maintained.

In assembling the device the link is engaged with the pivot 15 and the pivot 19 with the ends of the arms out of alignment before the arm 20 is secured to the housing. The arms may be then swung into the position in which they are shown. With the device assembled the link 17 cannot become disengaged from the pivots 15 and 19 even if a heavy weight be placed upon the right side of the platter 13 so that the end of the arm 14 is swung into engagement with the end of the arm 20.

The scale illustrated in Figure III is generally similar to that shown in Figure I. The base housing 1ª is, however, somewhat higher than the housing 1 of the scale shown in Figure I and the platform spider 12ª is provided with a downwardly extending spider stem 14ª having a cone pivot 15ª at its end which engages a depression in one end of a check link 17ª, the check link having a depression in its opposite end that is engaged by a cone pivot 19ª mounted upon an adjustable arm 20ª which is pivoted within the base housing so that it may be adjusted by manipulation of adjusting screws 21ª and 22ª.

The parts are so proportioned and arranged that lines connecting the cone pivots 15ª and 19ª and the fulcrum pivots 4ª and load pivot 11ª of the main lever 3ª form a parallelogram. When the load pivot 11ª is swung about the fulcrum pivot 4ª the pivot 15ª swings about the pivot 19ª to the same extent and the platform 13ª is thus kept level throughout weighing movements of the scale. In order that the pivot 15ª may always seat firmly in the depression in the end of the link 17ª and the link be kept under compression even though a capacity load be placed at the extreme right side of the platform 13ª, the spider 12ª is provided with a weighted arm 23ª which extends to the left, the mass of the weighted arm and the distance of its center of mass from the load pivot 11ª being more than sufficient to counterbalance a capacity load placed upon the right side of the platter 13ª. The weighted arm, therefore, always holds the pivot 15ª in the depression in one end of the link and keeps the depression in the other end of the link firmly engaged with the pivot 19ª. In order that the pivots 15ª and 19ª and the link 17ª may not become disengaged even if a very heavy load is placed upon the extreme right side of the platform 13ª, a stop screw 25ª is mounted in the base housing 1ª so that it may be turned to a position in which it is just out of engagement with the lower end of the stem 14ª. Under ordinary conditions the stem 14ª remains out of engagement with the stop screw 25ª, but if a load greatly beyond the capacity of the scale is placed upon the right side of the platter 13ª, the stop screw 25ª prevents the stem 14ª from swinging away from the link 17ª far enough to permit the pivots 15ª and 19ª and the link 17ª from becoming disengaged.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a frame, a lever connected thereto by means of a fulcrum pivot, said lever having a load pivot, a commodity-receiver located above said load pivot and positioned substantially symmetrically in respect thereto, an arm extending from said commodity-receiver, a link pivotally connecting said arm and said frame, the axes of the pivotal connections between said link, the arm and frame and the load and fulcrum pivots of said lever being in parallelogrammatic relation, and means for keeping said link in tension regardless of the position on the platform of a load within the capacity of the scale.

2. In a device of the class described, in combination, a frame, a lever connected thereto by means of a fulcrum pivot, said lever having a load pivot, a commodity-receiver located above said load pivot and positioned substantially symmetrically in respect thereto, an arm extending from said commodity-receiver, a link pivotally connecting said arm and said frame, the axes of the pivotal connections between said link, the arm and frame and the load and fulcrum pivots of said lever being in parallelogrammatic relation, and a weight fixed to said arm and tending to swing said commodity-receiver about said load pivot in a direction to keep said link in tension.

3. In a device of the class described, in combination, a frame, a lever connected thereto by means of a fulcrum pivot, said lever having a load pivot, a commodity-receiver located above said load pivot and positioned substantially symmetrically in respect thereto, an arm extending from said commodity-receiver, a link pivotally connecting said arm and said frame, the axes of the pivotal connections between said link, the arm and frame and the load and fulcrum pivots of said lever being in parallelogrammatic relation, and means for keeping said link under stress in one direction regardless of the position on the platform of a load within the capacity of the scale.

4. In a device of the class described, in combination, a frame, a lever connected thereto by means of a fulcrum pivot, said lever having a load pivot, a commodity-receiver located above said load pivot and positioned substantially symmetrically in respect thereto, an arm extending from said commodity-receiver, a link pivotally connecting said arm and said frame, the axes of the pivotal connections between said link, the arm and frame and the load and fulcrum pivots of said lever being in parallelogrammatic relation, and a weight fixed to said arm and tending to swing said commodity-receiver about said load pivot in a direction to keep said link under stress in one direction.

5. In a device of the class described, in combination, a frame, a lever supported thereon, a commodity-receiver pivoted on said lever, an arm extending laterally and upwardly from said commodity-receiver, a link connecting said arm and said frame, and a weight connected to said arm and so positioned as to keep said link in tension.

6. In a device of the class described, in combination, a base housing, a lever supported therein, an upright housing supported on said base housing, a commodity-receiver supported on said lever, an arm extending from said commodity-receiver laterally in said base housing and thence upwardly in said upright housing, a link connecting said arm to said upright housing, and a weight fixed on said arm and positioned to keep said link in tension.

7. In a device of the class described, in combination, a commodity-receiver, an arm extending therefrom, said arm having a cone pivot projecting laterally therefrom, a frame, a laterally projecting cone pivot thereon, said cone pivots projecting in opposite directions, and a link having sockets adapted to engage said cone pivots.

8. In a device of the class described, in combination, a U-shaped link having an inwardly opening socket in each of its arms, a pair of relatively movable members having laterally projecting cone pivots engaging said sockets, and abutment means on said members adapted to prevent said members from moving toward each other sufficiently to withdraw said cone pivots from said sockets.

EDWARD G. THOMAS.